United States Patent
Tagami et al.

(10) Patent No.: US 12,146,011 B2
(45) Date of Patent: Nov. 19, 2024

(54) CURED PRODUCT, OPTICAL ELEMENT, OPTICAL APPARATUS, AND IMAGE PICKUP APPARATUS

(71) Applicant: CANON KABUSHIKI KAISHA, Tokyo (JP)

(72) Inventors: Kei Tagami, Kanagawa (JP); Kouichi Yonetani, Kanagawa (JP); Kumiko Yashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 17/747,203

(22) Filed: May 18, 2022

(65) Prior Publication Data

US 2022/0403066 A1 Dec. 22, 2022

(30) Foreign Application Priority Data

May 27, 2021 (JP) .................. 2021-089311

(51) Int. Cl.
| | | |
|---|---|---|
| *C08F 20/06* | (2006.01) | |
| *C08L 29/12* | (2006.01) | |
| *C08L 33/08* | (2006.01) | |
| *C08L 33/10* | (2006.01) | |
| *C08L 79/02* | (2006.01) | |
| *C08L 81/06* | (2006.01) | |
| *G02B 1/04* | (2006.01) | |
| *H04N 5/225* | (2006.01) | |
| *H04N 23/55* | (2023.01) | |

(52) U.S. Cl.
CPC .............. *C08F 20/06* (2013.01); *C08L 29/12* (2013.01); *C08L 33/08* (2013.01); *C08L 33/10* (2013.01); *C08L 79/02* (2013.01); *C08L 81/06* (2013.01); *G02B 1/041* (2013.01); *H04N 23/55* (2023.01); *C08L 2201/10* (2013.01)

(58) Field of Classification Search
CPC ....... C08F 20/06; G02B 1/041; H04N 5/2254; C08L 79/02; C08L 81/06; C08L 29/12; C08L 33/08; C08L 33/10; C08L 2201/10
See application file for complete search history.

(56) References Cited

U.S. PATENT DOCUMENTS

| | | | |
|---|---|---|---|
| 9,290,597 B2 | 3/2016 | Saitoh | |
| 9,334,439 B2 | 5/2016 | Demeio et al. | |
| 10,145,996 B2 | 12/2018 | Demeio et al. | |
| 10,370,474 B2 | 8/2019 | Saitoh | |
| 2015/0175731 A1* | 6/2015 | Saitoh ..................... | G02B 1/04 560/194 |
| 2017/0320984 A1 | 11/2017 | Saitoh | |
| 2020/0012014 A1 | 1/2020 | Tagami et al. | |
| 2020/0223781 A1 | 7/2020 | Someya et al. | |

FOREIGN PATENT DOCUMENTS

| | | |
|---|---|---|
| EP | 3 591 441 A1 | 1/2020 |
| JP | 2014-43565 A | 3/2014 |
| JP | 2016-519691 A | 7/2016 |
| JP | 2018-165355 A | 10/2018 |
| TW | 201222149 A | 6/2012 |
| WO | 2014/149852 A2 | 9/2014 |
| WO | 2019/069488 A1 | 4/2019 |

OTHER PUBLICATIONS

Examination Report in Indian Application No. 202244029745 (Jan. 2023).
Extended European Search Report in European Application No. 22174509.4 (Nov. 2022).

* cited by examiner

*Primary Examiner* — Robert D Harlan
(74) *Attorney, Agent, or Firm* — Venable LLP (57) ABSTRACT

Provided is a cured product of a resin composition including a (meth)acrylate compound and a compound having at least one thiol group, wherein the content of the compound having at least one thiol group in the cured product is 30 mass % or less, and wherein the cured product has a secondary dispersion characteristic of 0.65 or more.

6 Claims, 2 Drawing Sheets

CURED PRODUCT, OPTICAL ELEMENT, OPTICAL APPARATUS, AND IMAGE PICKUP APPARATUS

BACKGROUND OF THE INVENTION

Field of the Invention

The present invention relates to a cured product, an optical element, an optical apparatus, and an image pickup apparatus.

Description of the Related Art

In general, the refractive index of an optical material, such as a glass material or an organic resin, gradually increases as the wavelength of light to be refracted by the material becomes shorter. For example, an Abbe number ($v_d$) and a secondary dispersion characteristic ($\theta_{g,F}$) are known as indicators each representing the wavelength dispersibility of the refractive index. The Abbe number and the secondary dispersion characteristic are values peculiar to each optical material, but in many cases, the values each fall within a certain range. The Abbe number ($v_d$: Abbe number with respect to d-line) and the secondary dispersion characteristic ($\theta_{g,F}$) are represented by the following equations.

$$v_d = (n_d - 1)/(n_F - n_C)$$

$$\theta_{g,F} = (n_g - n_F)/(n_F - n_C)$$

$n_d$: a refractive index at a wavelength of 587.6 nm
$n_F$: a refractive index at a wavelength of 486.1 nm
$n_C$: a refractive index at a wavelength of 656.3 nm
$n_g$: a refractive index at a wavelength of 435.8 nm However, an optical material having a high secondary dispersion characteristic deviating from a value in the certain range has also been synthesized by designing the configuration (material kind or molecular structure) of an optical material (e.g., a glass material or an organic resin) in detail.

In addition, when an optical element that is excellent in chromatic aberration-correcting function and has, for example, an aspherical shape is produced, a method involving molding an organic resin on a spherical glass or the like has the following advantage over a method involving using a glass material as a material: mass productivity, moldability, degree of freedom in shape, and lightweight property are excellent. However, the optical characteristic of a conventional organic resin falls within the above-mentioned certain range, and hence the number of organic resins showing specific dispersion characteristics is small.

In International Publication No. WO2019/069488, as a resin material having a high secondary dispersion characteristic, there is a disclosure of a cured product of a resin precursor containing a (meth)acrylate compound and a curable composition.

Although the cured product disclosed in International Publication No. WO2019/069488 has a high secondary dispersion characteristic, a component incorporated for suppressing the deposition of a monomer component in the resin precursor reduces the secondary dispersion characteristic as compared to the secondary dispersion characteristic of a cured product of the monomer component alone. Accordingly, the achievement of both of a high secondary dispersion characteristic and a transmittance is required.

In view of such background art, the present invention provides a cured product having a characteristic in that the secondary dispersion characteristic ($\theta_{g,F}$) of refractive indices is high (high $\theta_{g,F}$ characteristic), that is, a chromatic aberration-correcting function is high, and having a high transmittance, an optical element including the cured product, and an optical apparatus including the optical element.

SUMMARY OF THE INVENTION

A cured product of the present invention is a cured product of a resin composition including: at least one compound selected from an acrylate compound and a methacrylate compound; and a compound having at least one thiol group, wherein a content of the compound having at least one thiol group in the cured product is 30 mass % or less, and wherein the cured product has a secondary dispersion characteristic of 0.65 or more.

Further features of the present invention will become apparent from the following description of exemplary embodiments with reference to the attached drawings.

DESCRIPTION OF THE EMBODIMENTS

Now, embodiments of the present invention are described with reference to the drawings. The present invention is not limited to the following embodiments, and an embodiment obtained by, for example, appropriately changing or improving each of the following embodiments within a range not departing from the gist of the present invention based on general knowledge of a person skilled in the art is also encompassed in the scope of the present invention. The term "(meth)acrylate compound" as used herein means an acrylate compound and a methacrylate compound.

The inventor of the present invention has made extensive investigations with a view to providing a resin composition that can provide a cured product having a high secondary dispersion characteristic and a high transmittance characteristic. As a result, the inventor has found that a cured product achieving both of a high secondary dispersion characteristic and a high transmittance is obtained by adding a compound having at least one thiol group to a resin composition containing a (meth)acrylate compound showing a high secondary dispersion characteristic.

In general, a compound having a long conjugated structure typified by an aromatic compound has a band gap smaller than that of a general-purpose material, and hence its absorption edge in a UV region is positioned in a visible light region. Under the influence of the positioning, the compound having a long conjugated structure starts to have a high refractive index and a high secondary dispersion characteristic. However, a practical material is not obtained merely by linking aromatic compounds to build a long conjugated structure. For example, a large aromatic compound involves the following problems: the compound is difficult to synthesize; the compound is easily colored; the transmittance of the compound reduces at shorter wavelengths in the visible light region; the compound is poor in compatibility with any other compound; and the crystal of the compound is deposited in a composition containing the compound.

Accordingly, when a compound is utilized as an optical material, the length of the conjugated structure of the compound needs to be adjusted from the viewpoints of an improvement in transmittance and the suppression of crystallinity. However, when the conjugated structure of an aromatic compound is shortened or the intermolecular distance thereof is widened by the steric hindrance of a substituent thereof for improving the transmittance thereof and suppressing the crystallinity thereof, a reduction in refractive index thereof and a reduction in secondary dispersion characteristic thereof are caused. In addition, when a resin is added for improving the transmittance and suppressing the crystallinity, the reduction in refractive index and the reduction in secondary dispersion characteristic are similarly caused.

The inventor has conceived a resin composition according to the present invention to be as described below.

The inventor has conceived that a cured product of a resin composition including a (meth)acrylate compound having high secondary dispersibility and a compound having at least one thiol group is improved in transmittance by a curing shrinkage-reducing effect by the compound having at least one thiol group. Further, a high secondary dispersion characteristic is maintained and a high transmittance is obtained by setting the amount of the compound having at least one thiol group in the cured product to 30 mass % or less.

When any other resin component is added to the resin composition including the (meth)acrylate compound having high secondary dispersibility, the secondary dispersibility reduces in accordance with the amount of the other resin component. This is because the probability that the molecules of the other resin component react with each other becomes higher than the probability that the other resin component reacts with the (meth)acrylate compound having high secondary dispersibility along with an increase in amount thereof, and hence a component having low secondary dispersibility is produced. The compound having at least one thiol group selectively reacts with the (meth)acrylate compound because an ene-thiol reaction with the (meth)acrylate compound advances in the curing of the composition such as photocuring. In other words, the compound having at least one thiol group can suppress the production of the component having low secondary dispersibility in the curing of the resin composition, and the contribution of the addition amount of the compound having at least one thiol group to a reduction in secondary dispersion characteristic of the (meth)acrylate compound is small as compared to the other resin component. Accordingly, the addition of the compound having at least one thiol group to the resin composition including the (meth)acrylate compound may be capable of maintaining a high secondary dispersion characteristic and of providing a high transmittance.

The inventor has conceived that as a result of the foregoing, when the amount of the compound having at least one thiol group in the cured product is set to 30 mass % or less, a high transmittance can be obtained while a high secondary dispersion characteristic is maintained.

<<(Meth)acrylate Compound>>

The (meth)acrylate compound to be used in the present invention preferably has the following two features (a) and (b). When the (meth)acrylate compound has the features (a) and (b), both of a high secondary dispersion characteristic and a high transmittance can be achieved. The (meth)acrylate compound having the features (a) and (b) is hereinafter referred to as "(meth)acrylate compound (A)":

(a) the compound has an electron-withdrawing group or an electron-donating group, and the electron-withdrawing group and the electron-donating group are bonded to a total of two or more aryl groups and/or arylene groups; and (b) the compound has a total of 3 or 4 benzene rings, and the benzene rings may be bonded to each other.

Examples of the electron-withdrawing group include a carbonyl group, a sulfonyl group, and an imide group. An example of the electron-donating group is a trivalent group having a nitrogen atom. The (meth)acrylate compound (A) preferably has a sulfonyl group or a trivalent group having a nitrogen atom. When the (meth)acrylate compound (A) has a trivalent group having a nitrogen atom, the three bonding sites of the nitrogen atom are each independently bonded to an aryl group or an arylene group.

An example of the (meth)acrylate compound (A) is a (meth)acrylate compound represented by the following general formula (1) or (2).

Compound Represented by General Formula (1)

In the general formula (1), $R_1$ and $R_2$ each independently represent a substituted or unsubstituted alkyl group having 1 to 10 carbon atoms, or a substituted or unsubstituted alkylene group having 1 to 8 carbon atoms, the alkylene group having one of an acryloyloxy group and a methacryloyloxy group, and $R_3$ to $R_{12}$ each independently represent a hydrogen atom, a trifluoromethyl group, a substituted or unsubstituted alkyl group, a substituted or unsubstituted alkylene group having one of an acryloyloxy group and a methacryloyloxy group, an acryloyloxy group, or a methacryloyloxy group, provided that at least one of $R_3$ to $R_{12}$ represents a trifluoromethyl group, and at least one of $R_1$ to $R_{12}$ has one of an acryloyloxy group and a methacryloyloxy group.

[$R_1$ and $R_2$]

In the general formula (1), examples of the substituted or unsubstituted alkyl group having 1 to 10 carbon atoms represented by each of $R_1$ and $R_2$ include a methyl group, an ethyl group, a n-propyl group, an iso-propyl group, a n-butyl group, a n-pentyl group, and a n-hexyl group, and the alkyl group is not limited thereto as long as a high $\theta_{g,F}$ characteristic is obtained. It is preferred that $R_1$ and $R_2$ each independently represent a methyl group, an ethyl group, a n-propyl group, or a n-butyl group.

In the general formula (1), examples of the unsubstituted alkylene group having 1 to 8 carbon atoms, which has an acryloyloxy group or a methacryloyloxy group, represented by each of $R_1$ and $R_2$ include a methylene group, an ethylene group, a n-propylene group, an iso-propylene group, a n-butylene group, a n-pentylene group, and a n-hexylene group, and the alkylene group is not limited thereto as long as a high $\theta_{g,F}$ characteristic is obtained. Of those, a methylene group, an ethylene group, a n-propylene group, and a n-butylene group are preferred.

In the general formula (1), examples of the substituted alkylene group having 1 to 8 carbon atoms, which has an acryloyloxy group or a methacryloyloxy group, represented by each of $R_1$ and $R_2$ include a group introduced by substituting at least one $CH_2$ in a main chain of an alkylene group with an oxygen atom, and a group introduced by substituting at least one $CH_2$ in a main chain of an alkylene group with a sulfur atom, and the alkylene group is not limited thereto as long as a high secondary dispersion characteristic is obtained.

[$R_3$ to $R_{12}$]

In the general formula (1), examples of the substituted or unsubstituted alkyl group represented by each of $R_3$ to $R_{12}$ include a methyl group, an ethyl group, a n-propyl group, a n-butyl group, an iso-propyl group, an iso-butyl group, a sec-butyl group, and a tert-butyl group, and the alkyl group is not limited thereto as long as a high secondary dispersion characteristic is obtained. Of those, a methyl group and an ethyl group are preferred.

In the general formula (1), examples of the unsubstituted alkylene group having an acryloyloxy group or a methacryloyloxy group represented by each of $R_3$ to $R_{12}$ include a methylene group, an ethylene group, a n-propylene group, a n-butylene group, a n-pentylene group, and a n-hexylene group, and the alkylene group is not limited thereto as long as a high $\theta_{g,F}$ characteristic is obtained. Of those, a methylene group, an ethylene group, and a n-propylene group are preferred.

In the general formula (1), examples of the substituted alkylene group having an acryloyloxy group or a methacryloyloxy group represented by each of $R_3$ to $R_{12}$ include a group introduced by substituting at least one $CH_2$ in a main chain of an alkylene group with an oxygen atom, and a group introduced by substituting at least one $CH_2$ in a main chain of an alkylene group with a sulfur atom, and the alkylene group is not limited thereto as long as a high $\theta_{g,F}$ characteristic is obtained.

Compound Represented by General Formula (2)

(2)

In the general formula (2), X and Y each represent S or O, when X represents S, $R_{21}$ represents an alkyl group having 1 to 2 carbon atoms, and when X represents O, $R_{21}$ represents a hydrogen atom or an alkyl group having 1 to 2 carbon atoms, and when Y represents S, $R_{22}$ represents an alkyl group having 1 to 2 carbon atoms, and when Y represents O, $R_{22}$ represents a hydrogen atom or an alkyl group having 1 to 2 carbon atoms, $R_{23}$ to $R_{30}$ each independently represent a hydrogen atom or a methyl group, "a" and "b" each represent 1 or 2, when "a" represents 1, $Z_1$ represents a group represented by the following general formula (3), and when "a" represents 2, two $Z_1$s each represent a group represented by the following general formula (3), or one of $Z_1$s represents a group represented by the following general formula (3), and another $Z_1$ represents a methyl group, and when "b" represents 1, $Z_2$ represents a group represented by the following general formula (3), and when "b" represents 2, two $Z_2$s each represent a group represented by the following general formula (3), or one of $Z_2$s represents a group represented by the following general formula (3), and another $Z_2$ represents a methyl group.

(3)

In the general formula (3), X represents a bonding site, "m" represents 0 or 1, W represents a hydrogen atom or a methyl group, and V represents a group selected from groups represented by the following general formulae (4) to (6).

*—O—$C_nH_{2n}$—O—** (4)

*—S—$C_nH_{2n}$—S—** (5)

*—S—$C_nH_{2n}$—O—** (6)

In the general formulae (4) to (6), * represents a bonding site with an alkylene group, and ** represents a bonding site with one of an acryloyl group and a methacryloyl group.

In the general formulae (4) to (6), "n"s each independently represent 2, 3, or 4.

In the general formulae (4) to (6), at least one hydrogen atom of —$C_nH_{2n}$— may be substituted with a methyl group.

[X and Y]

In the general formula (2), when X and Y each represent an electron-donating element, the state of the conjugated structure of the compound becomes satisfactory, and hence a high secondary dispersion characteristic is obtained. In addition, in consideration of the ease of synthesis of the compound and the stability of the compound, X and Y each represent S or O. In consideration of the ease with which a raw material for the compound is purveyed, X and Y each preferably represent O. In addition, in consideration of the ease of synthesis, X and Y are preferably identical to each other.

[$R_{21}$ and $R_{22}$]

In the general formula (2), $R_{21}$ and $R_{22}$ each represent a hydrogen atom or an alkyl group having 1 to 2 carbon atoms for suppressing the deterioration of the optical characteristics of the compound. However, when X represents S, $R_{21}$ represents an alkyl group having 1 to 2 carbon atoms, and when Y represents S, $R_{22}$ represents an alkyl group having 1 to 2 carbon atoms. $R_{21}$ and $R_{22}$ each preferably represent an alkyl group having 1 to 2 carbon atoms. In addition, $R_{21}$ and $R_{22}$ may be identical to or different from each other, but are desirably identical to each other in consideration of the ease of synthesis.

[$R_{23}$ to $R_{30}$]

In the general formula (2), $R_{23}$ to $R_{30}$ each independently represent a hydrogen atom or a methyl group. $R_{23}$ to $R_{30}$ each preferably represent a hydrogen atom.

["a" and "b"]

In the general formula (2), "a" and "b" each represent 1 or 2. When "a" represents 2, two $Z_1$s may be identical to or different from each other. In addition, when "b" represents 2, two $Z_2$s may be identical to or different from each other. In consideration of the ease of synthesis, "a" and "b" each preferably represent 1.

[$Z_1$ and $Z_2$]

When "a" represents 1, $Z_1$ represents a group represented by the general formula (3), and when "a" represents 2, two $Z_1$s each represent a group represented by the general formula (3), or one of $Z_1$s represents a group represented by the general formula (3), and the other $Z_1$ represents a methyl group. When "b" represents 1, $Z_2$ represents a group represented by the general formula (3), and when "b" represents 2, two $Z_2$s each represent a group represented by the general formula (3), or one of $Z_2$s represents a group represented by the general formula (3), and the other $Z_2$ represents a methyl group. $Z_1$ and $Z_2$ may be identical to or different from each other, but are desirably identical to each other in consideration of the ease of synthesis.

["m"]

In the general formula (3), "m" represents 0 or 1 in consideration of the ease of availability of a raw material for the compound. "m" preferably represents 0.

[W]

In the general formula (3), W represents a hydrogen atom or a methyl group in consideration of the reactivity of a polymerization reaction and the ease with which a raw material for the compound is purveyed.

[V]

In the general formula (3), V represents a group selected from groups represented by the following general formulae (4) to (6) for suppressing the deterioration of the optical characteristics of a molded body to be obtained.

$$*\text{—O—}C_nH_{2n}\text{—O—}** \quad (4)$$

$$*\text{—S—}C_nH_{2n}\text{—S—}** \quad (5)$$

$$*\text{—S—}C_nH_{2n}\text{—O—}** \quad (6)$$

In the general formulae (4) to (6), * represents a bonding site with an alkylene group, and ** represents a bonding site with a (meth)acryloyl group. "n" represents 2, 3, or 4. At least one hydrogen atom of —$C_nH_{2n}$— may be substituted with a methyl group. The number of methyl groups with which hydrogen atoms are substituted is preferably 1 or 2 for suppressing the deterioration of the optical characteristics.

In consideration of the ease with which a raw material for the compound is purveyed and the ease of synthesis, V preferably represents a group represented by the general formula (4). More preferred examples of the group represented by V include *—O—CH(CH_3)—CH_2—O—**, *—O—CH_2—CH(CH_3)—O—**, *—O—CH_2—CH_2—CH_2—O—**, *—O—CH_2—CH(CH_3)—CH_2—O—**, and *—O—CH_2—C(CH_3)_2—CH_2—O—**.

SPECIFIC EXAMPLES

Specific examples of the (meth)acrylate compound that may be used in the present invention are represented below. However, the (meth)acrylate compound that may be used in the present invention is not limited thereto. In addition, the (meth)acrylate compounds may be used in combination thereof. That is, a cured product according to the present invention (polymer of the resin composition to be described later) may be a homopolymer of the (meth)acrylate compound, or may be a copolymer thereof.

Portions interrupted by two (|)s in the formula of Exemplified Compound M6 each have a structure represented by —O—$C_2H_3(CH_3)$—O—, the structure being formed by the combination of (|), methylene groups on both the sides of (|) each having a bonding site directed toward (|), and oxygen atoms bonded to the methylene groups. Herein, the structure represented by —O—$C_2H_3(CH_3)$—O— may be a structure represented by —O—CH(CH_3)CH_2—O—, or may be a structure represented by —O—CH_2CH(CH_3)—O—.

M1

M2

-continued

M3

M4

M5

M6

M7

M8

M9

M10

M11

M12

M13

M14

M15

M16

<Production Method>

A method of producing the (meth)acrylate compound to be used in the present invention is described by taking an example.

The method of producing the (meth)acrylate compound is not particularly limited, and any production method may be adopted. The (meth)acrylate compound may be synthesized using a known synthesis method. For example, the compound represented by the general formula (1) and the compound represented by the general formula (2) may be synthesized by known synthesis methods described in, for example, Japanese Patent Application Laid-Open No. 2018-165355 and Japanese Patent Application Laid-Open No. 2014-43565, respectively.

Two methods are each available for introducing a polymerizable functional group into the (meth)acrylate compound. One method is a method involving directly introducing a polymerizable functional group so that the (meth)acrylate compound may be obtained. The other method is a method involving introducing a structure having a polymerizable functional group or a functional group that is a precursor of the polymerizable functional group into a precursor of the (meth)acrylate compound. An example of the latter method is a method involving introducing a functional group-containing aryl group through use of a coupling reaction involving using a metal catalyst and a base based on a monoarylamine derivative.

For example, the following methods are each available for introducing an unsaturated hydrocarbon group (e.g., an acrylic group or a methacrylic group) into the (meth)acrylate compound. That is, a method involving causing a (meth)acrylate to act on a precursor of the (meth)acrylate compound having a hydroxy group, or a method involving directly introducing a polymerizable functional group so that the (meth)acrylate compound may be obtained is available.

The coupling reaction based on the metal catalyst may be arbitrarily selected. For example, the Ullmann reaction involving utilizing copper, the Buchwald-Hartwig reaction involving utilizing an amine or the like, the Suzuki coupling involving utilizing boric acid or the like, the Stille coupling involving utilizing an organotin, or the Negishi coupling involving utilizing an organozinc is suitably used as a typical method.

Any method may be selected as the (meth)acrylation reaction. For example, a method involving esterifying a hydroxy group with a (meth)acrylic acid halide or (meth) acrylic anhydride, or a transesterification reaction involving using a lower alcohol ester of (meth)acrylic acid is suitably used as a typical method. In addition, for example, a direct esterification reaction involving subjecting (meth)acrylic acid and the diol to dehydration condensation through use of a dehydration condensation agent such as N,N'-dicyclohexylcarbodiimide, or a method involving heating (meth)acrylic acid and the diol in the presence of a dehydrating agent such as sulfuric acid is suitably used.

In addition, a polymerization inhibitor may be used so that the polymerization of the (meth)acrylate compound may not advance at the time of a reaction for the production of the compound or at the time of its storage. Examples of the polymerization inhibitor that may be used include: hydroquinones, such as p-benzoquinone, hydroquinone, hydroquinone monomethyl ether, and 2,5-diphenyl-p-benzoquinone; and N-oxy radicals such as tetramethylpiperidinyl-N-oxy radical (TEMPO). The examples also include: substituted catechols such as t-butylcatechol; amines, such as phenothiazine, diphenylamine, and phenyl-o-naphthylamine; nitrosobenzene; picric acid; molecular oxygen; sulfur; and copper(II) chloride. Of those, hydroquinones, phenothiazine, and N-oxy radicals are preferred from the viewpoints of a general-purpose property and the suppression of the polymerization, and hydroquinones are particularly preferred.

A lower limit for the usage amount of the polymerization inhibitor is typically 10 ppm or more, preferably 50 ppm or more with respect to the (meth)acrylate compound, and an upper limit therefor is typically 10,000 ppm or less, preferably 1,000 ppm or less with respect thereto. In the case where the usage amount is excessively small, the following risk arises: the effect of the polymerization inhibitor is not expressed or the effect is small even when the effect is expressed, and hence the polymerization advances at the time of the reaction or at the time of condensation in a posttreatment step. In contrast, the case where the usage amount is excessively large is not preferred because the following risk arises: the polymerization inhibitor serves as, for example, an impurity at the time of the production of a resin composition to be described later, and has an adverse effect such as the inhibition of the polymerization reactivity of the (meth)acrylate compound.

<<Resin Composition>>

The resin composition according to the present invention includes the (meth)acrylate compound and the compound having at least one thiol group in a molecule thereof.

The content of the (meth)acrylate compound to be incorporated into the resin composition, preferably the content of the (meth)acrylate compound (A) is preferably 1.0 to 99 mass %, more preferably 50 to 99 mass % with respect to the entirety of the resin composition.

<Compound Having at Least One Thiol Group>

The content of the compound having at least one thiol group to be incorporated into the resin composition is 30 mass % or less, preferably 0.01 to 30 mass % with respect to the entirety of the resin composition. The content of the compound having at least one thiol group to be incorporated into the resin composition is more preferably 1 to 15 mass % in consideration of the refractive index characteristic and transmittance of the resin composition to be obtained, and the content is still more preferably 2 to 10 mass % in consideration of the brittleness of the molded body to be obtained.

The compounds each having at least one thiol group may be used alone or in combination thereof. The compound having at least one thiol group is not particularly limited as long as the compound does not have a large influence on the optical characteristics of the molded body. Examples of the compound having at least one thiol group include, but not limited to, ethanethiol, 1-propanethiol, 1-butanethiol, 1-pentanethiol, 1-hexanethiol, 1-heptanethiol, 1-octanethiol, 1-decanethiol, 1-undecanethiol, 1-dodecanethiol, 1-tetradecanethiol, 1-pentadecanethiol, 1-hexadecanethiol, 1-octadecanethiol, 1-eicosanethiol, 1-docosanethiol, cyclohexanethiol, cyclopentanethiol, 2-propanethiol, 2-butanethiol, isobutyl mercaptan, isopentanethiol, 2-methyl-2-propanethiol, 2-methyl-1-butanethiol, 2-ethyl-1-hexanethiol, 3-methyl-2-butanethiol, tert-dodecyl mercaptan, tert-tetradecanethiol, tert-hexadecanethiol, 1,2-ethanedithiol, 1,2-propanedithiol, 1,3-propanedithiol, 1,2-butanedithiol, 1,4-butanedithiol, 2,3-butanedithiol, 1,5-pentanedithiol, 1,6-hexanedithiol, 1,8-octanedithiol, 3,6-dioxa-1,8-octanedithiol, 3,7-dithia-1,9-nonanedithiol, 1,10-decanedithiol, bis(2-mercaptoethyl) ether, bis(2-mercaptoethyl) sulfide, 1,4-bis(3-mercaptobutyryloxy) butane, 1,3,5-tris(2-(3-sulfanylbutanoyloxy)ethyl)-1,3,5-triazinane-2,4,6-trione, trimethylolpropane tris(3-mercaptobutyrate), pentaerythritol tetrakis(3-mercaptobutyrate), octadecyl 3-mercaptopropionate, 2-ethylhexyl-3-mercaptopropionate, n-octyl-3-mercaptopropionate, methoxybutyl-3-mercaptopropionate, stearyl-3-mercaptopropionate, ethylene bis(thioglycolate), 1,4-butanediol bis(thioglycolate), ethylene glycol bis(3-mercaptopropionate), tetraethylene glycol bis(3-mercaptopropionate), trimethylolpropane tris (thioglycolate), trimethylolpropane tris(3-mercaptopropionate), tris[2-(3-mercaptopropionyloxy) ethyl] isocyanurate, pentaerythritol tetrakis (mercaptoacetate), pentaerythritol tetra(3-mercaptopropionate), and dipentaerythritol hexakis(3-mercaptopropionate).

<Other Component>

The resin composition to be used in the present invention may include a polymerization initiator or a polymerization inhibitor, and may include a photosensitizer, a light stabilizer, a heat stabilizer, an antioxidant, or any other resin component as required.

[Polymerization Initiator]

Examples of the polymerization initiator include, but not limited to, a polymerization initiator that generates a radical species or a cation species through light irradiation, and a polymerization initiator that generates a radical species with heat.

Examples of the polymerization initiator that generates a radical species through light irradiation include, but not limited to, 2-benzyl-2-dimethylamino-1-(4-morpholinophenyl)-1-butanone and 1-hydroxy-cyclohexyl-phenyl ketone. The examples also include, but not limited to, 2-hydroxy-2-methyl-1-phenyl-propan-1-one, bis(2,4,6-trimethylbenzoyl)-phenylphosphine oxide, 4-phenylbenzophenone, and 4-phenoxybenzophenone. The examples also include, but not limited to, 4,4'-diphenylbenzophenone and 4,4'-diphenoxybenzophenone.

In addition, suitable examples of the polymerization initiator that generates a cation species through light irradiation include, but not limited to, polymerization initiators such as iodonium (4-methylphenyl)[4-(2-methylpropyl)phenyl]-hexafluorophosphate.

Further, examples of the polymerization initiator that generates a radical species with heat include, but not limited to: azo compounds such as azobisisobutyronitrile (AIBN); and benzoyl peroxide, t-butyl peroxypivalate, and t-butyl peroxyneohexanoate. The examples also include, but not limited to, peroxides, such as t-hexyl peroxyneohexanoate, t-butyl peroxyneodecanoate, t-hexyl peroxyneodecanoate, and cumyl peroxyneohexanoate.

When UV light or the like is applied as light to initiate the polymerization, a known sensitizer or the like may be used. Examples of the sensitizer include, but not limited to, benzophenone, 4,4-diethylaminobenzophenone, and 1-hydroxycyclohexyl phenyl ketone. The examples also include, but not limited to, isoamyl p-dimethylaminobenzoate, methyl 4-dimethylaminobenzoate, benzoin, benzoin ethyl ether, benzoin isobutyl ether, benzoin isopropyl ether, and 2,2-diethoxyacetophenone. The examples also include, but not limited to, methyl o-benzoylbenzoate, 2-hydroxy-2-methyl-1-phenylpropan-1-one, and acylphosphine oxides.

The content ratio of the photopolymerization initiator with respect to polymerizable components may be appropriately selected in accordance with a light irradiation amount and an additional heating temperature. In addition, the content ratio may be adjusted in accordance with the target average molecular weight of a polymer to be obtained.

The content of the photopolymerization initiator to be used in the polymerization (curing) and molding of the resin composition to be used in the present invention preferably falls within the range of from 0.01 to 10.00 mass % with respect to the total amount of the polymerizable components. The photopolymerization initiators may be used alone or in combination thereof in accordance with the reactivity of the resin and the wavelength of the light to be applied.

[Polymerization Inhibitor]

Examples of the polymerization inhibitor include the same inhibitors as those described in the section "<<(Meth) acrylate Compound>><Production Method>." In addition, the content of the polymerization inhibitor is as described in the section "<<(Meth)acrylate Compound>><Production Method>."

[Light Stabilizer]

The light stabilizer is not particularly limited as long as the light stabilizer does not have a large influence on the optical characteristics of the cured product. Typical examples thereof include benzotriazole-based materials, such as 2-(2H-benzotriazol-2-yl)-p-cresol and 2-(2H-benzotriazol-2-yl)-4,6-bis(1-methyl-1-phenylethyl)phenol. The examples also include 2-[5-chloro(2H)-benzotriazol-2-yl-4-methyl-6-(tert-butyl)]phenol and 2-(2H-benzotriazol-2-yl)-4,6-di-tert-pentylphenol. The examples also include 2-(2H-benzotriazol-2-yl)-4-(1,1,3,3-tetramethylbutyl)phenol. The examples also include 2,2'-methylenebis[6-(2H-benzotriazol-2-yl)-4-(1,1,3,3-tetramethylbutyl)]phenol and 2-(2H-benzotriazol-2-yl)-6-dodecyl-4-methylphenol. The examples also include cyanoacrylate-based materials, such as ethyl 2-cyano-3,3-diphenylacrylate and 2-ethylhexyl 2-cyano-3,3-diphenylacrylate. The examples may also include triazine-based materials; and benzophenone-based materials, such as octabenzone and 2,2'-4,4'-tetrahydrobenzophenone. The light stabilizer may also serve as the photosensitizer, and in that case, the photosensitizer may not be added.

The content of the light stabilizer to be used in the polymerization (curing) and molding of the resin composition to be used in the present invention preferably falls within the range of from 0.01 to 10.00 mass % with respect to the total amount of the polymerizable components.

[Heat Stabilizer]

The heat stabilizer is not particularly limited as long as the heat stabilizer does not have a large influence on the optical characteristics of the cured product. Examples thereof include hindered phenol-based materials such as pentaerythritol tetrakis[3-(3,5-di-tert-butyl-4-hydroxyphenyl)]propionate. The examples also include octadecyl-3-(3,5-di-tert-butyl-4-hydroxyphenyl)propionate, 3,5-bis(1,1-dimethylethyl)-4-hydroxybenzenepropanoic acid, and C7-C9 side chain alkyl esters. The examples also include 4,6-bis(octylthiomethyl)-o-cresol, 4,6-bis(dodecylthiomethyl)-o-cresol, and ethylenebis(oxyethylene)bis[3-(5-tert-butyl-4-hydroxy-m-tolyl)]propionate. The examples also include hexamethylenebis[3-(3,5-di-tert-butyl-4-hydroxyphenyl)]propionate. In addition, phosphorus-based materials such as tris(2,4-di-tert-butylphenyl)phosphite, and sulfur-based materials such as dioctadecyl 3,3'-thiodipropionate may each be used.

The content of the heat stabilizer to be used in the polymerization (curing) and molding of the resin composition to be used in the present invention preferably falls within the range of from 0.01 to 10.00 mass % with respect to the total amount of the polymerizable components.

[Antioxidant]

The antioxidant is not particularly limited as long as the antioxidant does not have a large influence on the optical characteristics of the molded body. Typical examples thereof include hindered amine-based materials. An example thereof is bis(2,2,6,6-tetramethyl-4-piperidyl) sebacate. Another example thereof is bis(1,2,2,6,6-pentamethyl-4-piperidyl) [[3,5-bis(1,1-dimethylethyl)-4-hydroxyphenyl]methyl]butyl malonate.

The content of the antioxidant to be used in the polymerization (curing) and molding of the resin composition to be used in the present invention preferably falls within the range of from 0.01 to 10.00 mass % with respect to the total amount of the polymerizable components.

[Other Resin Component]

The other resin component to be incorporated into the resin composition to be used in the present invention is not particularly limited. Examples thereof include, but not limited to: (meth)acrylate compounds, such as 1,3-adamantanediol dimethacrylate, 1,3-adamantanedimethanol dimethacrylate, tricyclodecanedimethanol diacrylate, pentaerythritol tetraacrylate, propoxylated neopentyl glycol diacrylate, dipropylene glycol diacrylate, ethoxylated bisphenol A dimethacrylate, tris(2-hydroxyethyl) isocyanurate triacrylate, 2-(2-ethoxyethoxy)ethyl acrylate, stearyl acrylate, tetrahydrofurfuryl acrylate, 2-phenoxyethyl acrylate, isodecyl acrylate, isobornyl acrylate, isobornyl methacrylate, 1,3-butylene glycol diacrylate, 1,4-butanediol diacrylate, diethylene glycol diacrylate, 1,6-hexanediol diacrylate, triethylene glycol diacrylate, tripropylene glycol diacrylate, dipropylene glycol diacrylate, triethylene glycol dimethacrylate, ethylene glycol dimethacrylate, tetraethylene glycol dimethacrylate, 1,4-butanediol dimethacrylate, diethylene glycol dimethacrylate, 1,6-hexanediol dimethacrylate, tripropylene glycol dimethacrylate, dipropylene glycol dimethacrylate, trimethylol propane trimethacrylate, 9,9-bis

[4-(2-acryloyloxyethoxy)phenyl]fluorene, 9,9-bis[4-(2-methacryloyloxyethoxy)phenyl]fluorene, 9,9-bis[4-(2-acryloyloxy)phenyl]fluorene, 9,9-bis[4-(2-methacryloyloxy)phenyl]fluorene, benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, 1,1-bis(4-acryloxyethoxyphenyl)sulfone, 1,1-bis(4-methacryloxyethoxyphenyl)sulfone, 1,1-bis(4-acryloxydiethoxyphenyl)sulfone, 1,1-bis(4-methacryloxydiethoxyphenyl)sulfone, dimethylol tricyclodecane diacrylate, trimethylol propane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methyl thioacrylate, methyl thiomethacrylate, phenyl thioacrylate, benzyl thiomethacrylate, xylylene dithiol diacrylate, xylylene dithiol dimethacrylate, mercaptoethyl sulfide diacrylate, and mercaptoethyl sulfide dimethacrylate; allyl compounds, such as allyl glycidyl ether, diallyl phthalate, diallyl terephthalate, diallyl isophthalate, diallyl carbonate, and diethylene glycol bisallyl carbonate; vinyl compounds, such as styrene, chlorostyrene, methylstyrene, bromostyrene, dibromostyrene, divinylbenzene, and 3,9-divinylspirobi(m-dioxane); and diisopropenylbenzene. Of those, an acrylate resin and a methacrylate resin are particularly preferred from the viewpoint of being excellent in optical characteristics and moldability.

In addition, the other resin component may be a thermoplastic resin. Examples thereof include: polyolefin-based resins, such as an ethylene homopolymer, a random or block copolymer of ethylene and one or two or more kinds of α-olefins, such as propylene, 1-butene, 1-pentene, 1-hexene, and 4-methyl-1-pentene, a random or block copolymer of ethylene and one or two or more kinds of vinyl acetate, acrylic acid, methacrylic acid, methyl acrylate, and methyl methacrylate, a propylene homopolymer, a random or block copolymer of propylene and one or two or more kinds of α-olefins except propylene, such as 1-butene, 1-pentene, 1-hexene, and 4-methyl-1-pentene, a 1-butene homopolymer, an ionomer resin, and a mixture of those polymers; hydrocarbon atom-based resins, such as a petroleum resin and a terpene resin; polyester-based resins, such as polyethylene terephthalate, polybutylene terephthalate, and polyethylene naphthalate; polyamide-based resins, such as nylon 6, nylon 66, nylon 11, nylon 12, nylon 610, nylon 6/66, nylon 66/610, and nylon MXD; acrylic resins, such as polymethyl methacrylate; styrene- or acrylonitrile-based resins, such as polystyrene, a styrene-acrylonitrile copolymer, a styrene-acrylonitrile-butadiene copolymer, and polyacrylonitrile; polyvinyl alcohol-based resins, such as polyvinyl alcohol and an ethylene-vinyl alcohol copolymer; polycarbonate resins; polyketone resins; polymethylene oxide resins; polysulfone resins; polyimide resins; and polyamide imide resins. Those resins may be used alone or as a mixture thereof.

The content of the other resin component to be incorporated into the resin composition is preferably 0.01 to 99 mass %. The content is more preferably 0.01 to 50 mass % in consideration of the refractive index characteristic of the resin composition to be obtained and the brittleness of the molded body. In addition, the content is still more preferably 0.01 to 20.0 mass %. Further, an acrylate resin and a methacrylate resin are still more preferably incorporated at 0.01 to 20.0 mass % thereinto for maintaining a secondary dispersion characteristic and a transmittance.

<<Cured Product>>

The cured product of the present invention is a cured product of the above-mentioned resin composition of the present invention, and the secondary dispersion characteristic of the cured product is 0.65 or more. The secondary dispersion characteristic of the cured product is more preferably 0.70 or more.

The content of the compound having at least one thiol group in the cured product is preferably 0.01 to 30 mass %. The content is preferably 1 to 15 mass % in consideration of the refractive index characteristic and transmittance of the cured product, and the content is more preferably 2 to 10 mass % in consideration of the brittleness of the cured product.

The secondary dispersion characteristic ($\theta_{g,F}$) of the cured product is represented by the following equation. Herein, refractive indices are refractive indices at room temperature (23° C.).

$$\theta_{g,F}(n_g-n_F)/(n_F-n_C)$$

$n_d$: a refractive index at a wavelength of 587.6 nm
$n_F$: a refractive index at a wavelength of 486.1 nm
$n_C$: a refractive index at a wavelength of 656.3 nm
$n_g$: a refractive index at a wavelength of 435.8 nm A ratio (carbon atoms/sulfur atoms) between carbon atoms and sulfur atoms to be incorporated into the cured product of the present invention is preferably 15 to 130. The ratio between the carbon atoms and the sulfur atoms is preferably 30 or more and less than 100 in consideration of the transmittance of the cured product to be obtained, and the ratio is more preferably 50 or more and less than 100 in consideration of the brittleness of the cured product.

<<Optical Element>>

Next, an optical element according to the present invention is described with reference to the drawings.

The optical element of the present invention is characterized by including the above-mentioned cured product of the present invention. The cured product of the present invention shows a secondary dispersion characteristic as high as 0.65 or more, and hence a chromatic aberration can be efficiently removed in the optical element of the present invention.

Figure 1A:
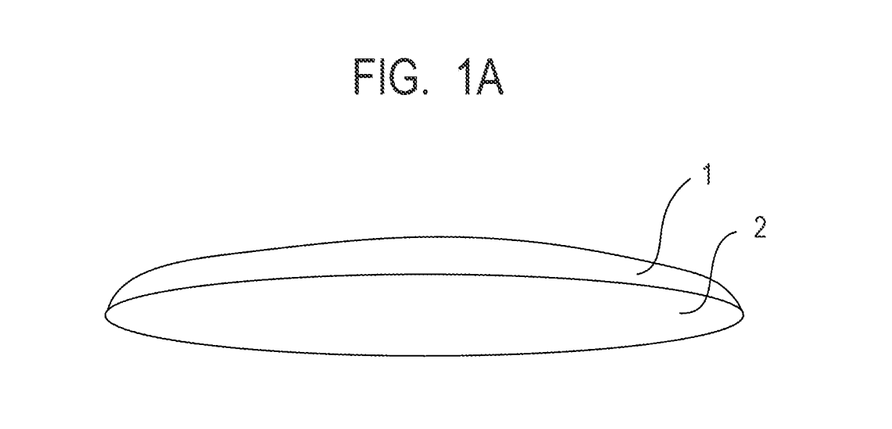
FIG. 1A and FIG. 1B are each a sectional view in a thickness direction for schematically illustrating the configuration of an example of an optical element of the present invention.
Figure 1B:
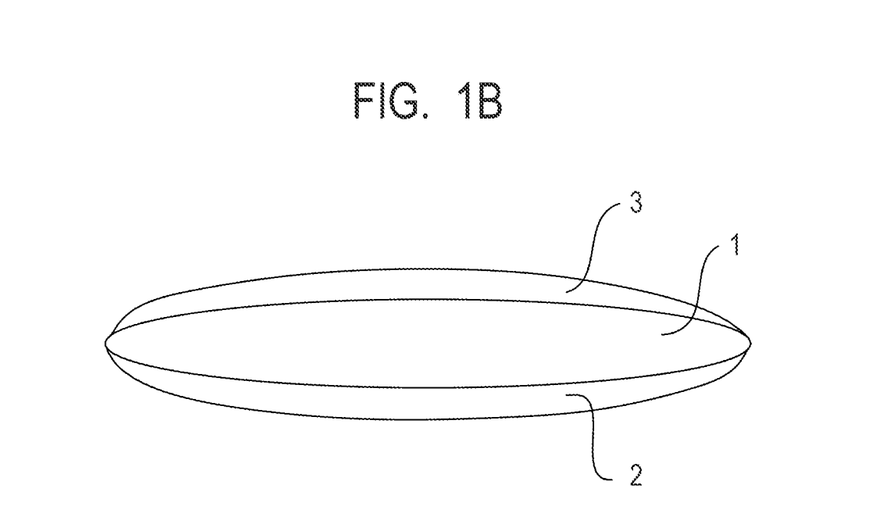

A schematic sectional view in a thickness direction in an embodiment of the optical element of the present invention is illustrated in each of FIG. 1A and FIG. 1B. In FIG. 1A, a thin film of a cured product 1 is arranged on one surface of a transparent substrate 2.

A transparent resin or a transparent glass may be used as the transparent substrate 2. Herein, the term "transparent" as used herein means that a transmittance for the entire range of visible light (light having a wavelength in the range of from 380 to 780 nm) is 30% or more. A glass is preferably used as the transparent substrate 2, and for example, a general optical glass typified by a silicate glass, a borosilicate glass, or a phosphate glass, a quartz glass, or a glass ceramic may be used. The transparent substrate 2 is preferably a circular shape when viewed in a plan view.

As a method of producing the optical element of FIG. 1A, for example, a method involving forming a layer structure having a small thickness on the transparent substrate 2 is adopted. Specifically, a die formed of a metal material is arranged so as to have a certain distance from the transparent substrate 2, and a gap present between the die and the transparent substrate 2 is filled with a resin composition having flowability. After that, die molding is performed by lightly pressing down the die. Then, the resin composition is polymerized while being kept in the state as required.

Light irradiation to be used in such polymerization reaction is performed by using light having a suitable wavelength, typically UV light or visible light in correspondence with a mechanism resulting from radical formation involving using a photopolymerization initiator. For example, raw materials, such as the monomers of the resin composition, are uniformly irradiated with the light through the light-transmitting material to be utilized as the transparent substrate 2. An irradiation light amount is appropriately selected in accordance with the mechanism resulting from the radical formation involving utilizing the photopolymerization initiator and with the content ratio of the photopolymerization initiator to be incorporated.

Meanwhile, in such curing of the resin composition by a photopolymerization reaction, it is more preferred that the entirety of the resin composition subjected to the die molding be uniformly irradiated with the irradiation light. Accordingly, it is more preferred to select light having such a wavelength that the light irradiation to be utilized can be uniformly performed through the light-transmitting material to be utilized as the transparent substrate 2. At this time, a reduction in thickness of the cured product 1 to be formed on the transparent substrate 2 is more suitable for the present invention.

In addition, in FIG. 1B, a thin film of the cured product 1 obtained by curing the above-mentioned resin composition is sandwiched between transparent substrates 2 and 3. In FIG. 1B, the transparent substrates 2 and 3 each have a concave surface on a facing side, and are brought into contact with each other in their outer peripheries, and both the surfaces of the cured product 1 are convex lens shapes. A transparent resin or a transparent glass may be used as the transparent substrate 2 or 3, and a glass is preferred. A general optical glass typified by a silicate glass, a borosilicate glass, or a phosphate glass, a quartz glass, or a glass ceramic may be used as the glass. The transparent substrate 2 or 3 is preferably a circular shape when viewed in a plan view.

A method of producing the optical element of FIG. 1B is, for example, as described below. The resin composition is poured into a gap between the transparent substrates 2 and 3, and is molded by being lightly pressed down. Then, the photopolymerization of the resin composition is performed while the composition is kept in the state. Thus, a laminate in which the cured product 1 is sandwiched between the transparent substrates 2 and 3 can be obtained.

Similarly, the molded body may be produced by a thermal polymerization method. In this case, it is desired that the temperature of the entirety of the composition be further uniformized, and a reduction in total thickness of the molded body of the resin composition to be formed on the substrate of the light-transmitting material is more suitable for the present invention. In addition, when the total thickness of the molded body of the resin composition to be formed is increased, an irradiation amount, an irradiation intensity, a light source, and the like need to be selected while the thickness, the absorption of a resin component, and the absorption of a fine particle component are further considered.

Specific application examples of the optical element of the present invention are described. The specific application examples include: a lens for forming an optical apparatus (image taking optical system) for a camera or a video camera; and a lens for forming an optical apparatus (projecting optical system) for a liquid crystal projector. In addition, the optical element may be used in a pickup lens of a DVD recorder or the like. Those optical systems each include a plurality of lenses arranged in a housing, and the optical element of the present invention may be used as at least one of the plurality of lenses.

<<Optical Apparatus and Image Pickup Apparatus>>

An optical apparatus of the present invention includes: a housing; and an optical system arranged in the housing, the optical system having a plurality of lenses, wherein at least one of the plurality of lenses is the optical element of the present invention.

An image pickup apparatus of the present invention includes: a housing; an optical system arranged in the housing, the optical system having a plurality of lenses; and an image pickup element configured to receive light that has passed through the optical system, wherein at least one of the plurality of lenses is the optical element of the present invention.

Figure 2:
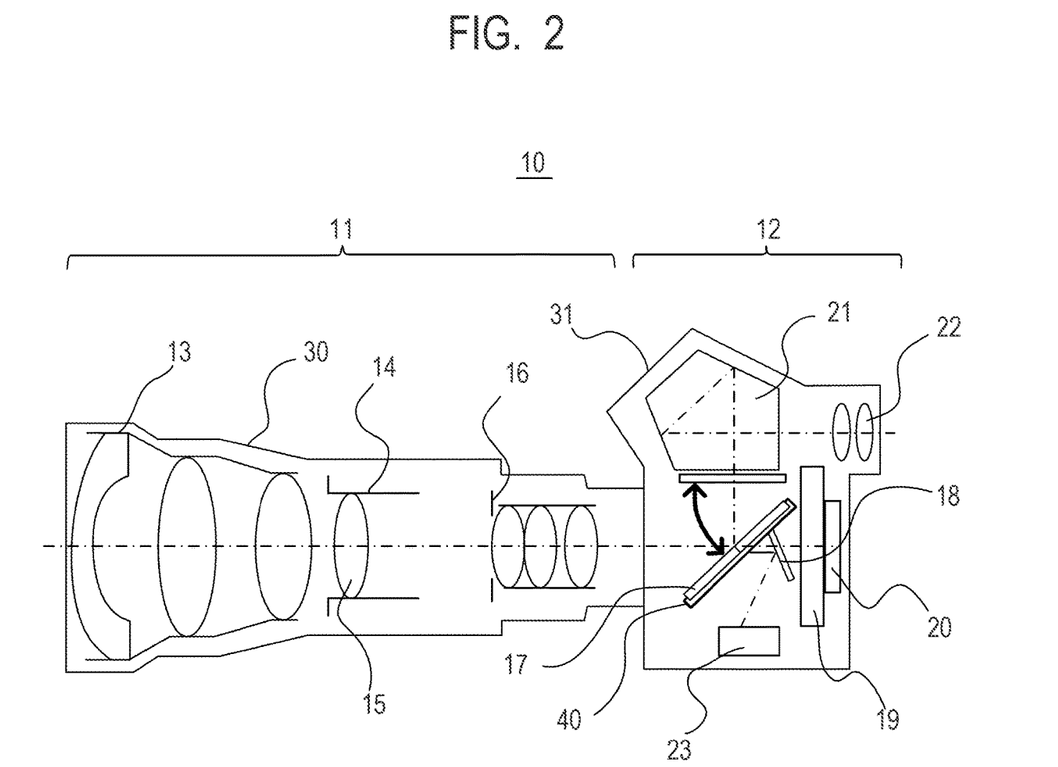
FIG. 2 is a sectional view for schematically illustrating the configuration of an image pickup apparatus using the optical element of the present invention.

FIG. 2 is an illustration of an example of the image pickup apparatus using the optical element according to an exemplary embodiment of the present invention, and is an illustration of the configuration of a single-lens reflex digital camera 10. FIG. 2 is a schematic sectional view including the optical axis of the used optical element. In FIG. 2, a camera main body 12 and a lens barrel 11 that is an optical apparatus are connected to each other, and the lens barrel 11 is a so-called interchangeable lens removably mounted onto the camera main body 12.

An image of light from an object is taken through an optical system formed of, for example, a plurality of lenses 13 and 15 arranged on the optical axis of an image taking optical system in the housing 30 of the lens barrel 11. The optical element of the present invention may be used in, for example, each of the lenses 13 and 15. Herein, the lens 15 is supported by an inner barrel 14, and is movably supported with respect to the outer barrel of the lens barrel 11 for focusing and zooming.

In an observation period before the image taking, the light from the object is reflected by a main mirror 17 in the housing 31 of the camera main body to be transmitted through a prism 21. After that, the taken image is projected to a photographer through a finder lens 22. The main mirror 17 is, for example, a half mirror, and the light that has been transmitted through the main mirror 17 is reflected toward an autofocus (AF) unit 23 by a submirror 18. The reflected light is used in, for example, distance measurement. In addition, the main mirror 17 is mounted on and supported by a main mirror holder 40 through bonding or the like. At the time of the image taking, the main mirror 17 and the submirror 18 are moved to the outside of an optical path via a driving mechanism (not shown) to open a shutter 19 so that an image pickup element 20 may receive the light that has entered from the lens barrel 11 and has passed through the image taking optical system to form a taken light image. In addition, a diaphragm 16 is configured to be capable of changing brightness and a focal depth at the time of the image taking by changing its opening area.

Herein, the image pickup apparatus has been described by using the single-lens reflex digital camera. However, the optical element of the present invention may be similarly used in, for example, a smartphone or a compact digital camera.

EXAMPLES

The present invention is described in more detail below by way of Examples. The present invention is by no means limited to Examples described below without departing from the gist of the present invention.

Synthesis of (Meth)acrylate Compound (A)

Synthesis of Exemplified Compounds M1, M2, M5, and M8

Exemplified Compound M1 and Exemplified Compound M2 were synthesized as compounds each represented by the general formula (1), and Exemplified Compound M5 and Exemplified Compound M8 were synthesized as compounds each represented by the general formula (2). Those compounds were synthesized based on the description of Japanese Patent Application Laid-Open No. 2018-165355 and Japanese Patent Application Laid-Open No. 2014-043565.

Synthesis of Exemplified Compound M10

(1) Synthesis of Intermediate of Exemplified Compound M10

Under a nitrogen atmosphere, 21.58 g of 4-chlorobenzotrifluoride, 8.0 g of 2-(4-aminophenyl)ethanol, 66.50 g of cesium carbonate, and 0.33 g of bis(dibenzylideneacetone) palladium were loaded into a 500-milliliter three-necked flask. In addition, 0.56 g of 2-dicyclohexylphosphino-2',4',6'-triisopropylbiphenyl and 280 mL of o-xylene were loaded thereinto. After the resultant was heated to 120° C., the resultant was stirred for 6 hours under the temperature. After the resultant was left to cool to room temperature (25° C.), an organic phase was extracted with ethyl acetate. The resultant organic phase was washed with brine and water in the stated order, and was dried with anhydrous magnesium sulfate. The resultant crude product was purified by column chromatography. Thus, 14.3 g of an intermediate of Exemplified Compound M10 was obtained (yield: 57%).

(2) Synthesis of Exemplified Compound M10

Under a nitrogen atmosphere, 10.0 g of the intermediate of Exemplified Compound M10, 350 mL of tetrahydrofuran, 0.88 g of hydroquinone monomethyl ether (MEHQ), and 13.0 mL of triethylamine were loaded into a 500-milliliter three-necked flask. After that, 12.0 g of methacrylic anhydride was dropped into the mixture, and the whole was heated, followed by reflux stirring for 20 hours. The reaction liquid was diluted with toluene, and the resultant organic phase was washed with acidic and basic aqueous solutions. After that, the organic phase was dried with brine and anhydrous magnesium sulfate. The solvent was removed, and the resultant crude product was purified by silica gel chromatography. Thus, 6.5 g of Exemplified Compound M10 was obtained (yield: 56%).

<<Sulfur-containing Compound>>

Sulfur-containing compound S1: bis(2-mercaptoethyl) sulfide (manufactured by Tokyo Chemical Industry Co., Ltd.)

Sulfur-containing compound S2: 1,4-butanediol bis(thioglycolate) (manufactured by Tokyo Chemical Industry Co., Ltd.)

Sulfur-containing compound S3: trimethylolpropane tris (3-mercaptopropionate) (manufactured by Tokyo Chemical Industry Co., Ltd.)

Sulfur-containing compound S4: pentaerythritol tetra(3-mercaptopropionate) (manufactured by Tokyo Chemical Industry Co., Ltd.)

Sulfur-containing compound S5: dodecanethiol (manufactured by Tokyo Chemical Industry Co., Ltd.)

<<Other Resin Component>>

Other resin component R1: 1,6-hexanediol methacrylate (manufactured by Tokyo Chemical Industry Co., Ltd.)

Other resin component R2: triethylene glycol dimethacrylate (manufactured by Tokyo Chemical Industry Co., Ltd.)

Other resin component R3: tricyclodecane dimethanol diacrylate (manufactured by Shin-nakamura Chemical Co., Ltd.)

<<Polymerization Aid>>

Polymerization inhibitor I1: methoxyphenol (manufactured by Fujifilm Wako Pure Chemical Corporation)

Polymerization initiator I2: "Irgacure TPO" diphenyl(2,4,6-trimethylbenzoyl)phosphine oxide) (manufactured by BASF)

Example 1

(1) Preparation of Resin Composition

Exemplified Compound M1, the compound S1 having at least one thiol group, the other resin component R1, the polymerization inhibitor I1, and the polymerization initiator I2 were mixed at 81:10:9:0.1:0.2 (mass ratio) to prepare a resin composition.

(2) Measurement of Refractive Indices and Secondary Dispersion Characteristic ($\theta_{g,F}$)

The resin composition was mounted on a high-refractive index glass having a thickness of 1 mm ("S-TIH11" manufactured by HOYA Corporation) while a spacer having a thickness of 500 m was arranged therebetween. Next, a quartz glass was mounted on the resin composition serving as a measurement object, and the composition was pressed and spread through the spacer so as to have a thickness of 500 m. UV light from a high-pressure mercury lamp ("EX250" manufactured by HOYA-SCHOTT) having a short-wavelength cut filter (UV: 385 nm) arranged on its light source was applied to the sample to cure the resin composition sandwiched between the two glass substrates. After the curing, heating treatment was performed at 100° C. for 12 hours for completing the reaction. Thus, a measurement sample was produced.

The refractive indices of the measurement sample were measured with an Abbe refractometer (manufactured by Kalnew Optical Industrial Co., Ltd.), and the secondary dispersion characteristic ($\theta_{g,F}$) thereof was calculated from the refractive indices and evaluated. When the value of the secondary dispersion characteristic was 0.65 or more, the characteristic was evaluated as being satisfactory. The refractive indices of the glass substrates to be used need to be higher than those of the cured product of the resin composition. The evaluation result is shown in Table 1.

(3) Transmittance Measurement

A transmittance measurement sample having a thickness of 500 m and a transmittance measurement sample having a thickness of 1,000 m were produced in the same manner as in the measurement of the secondary dispersion characteristic. The refractive index measurement sample produced for the measurement of the secondary dispersion characteristic may be used as the transmittance measurement sample having a thickness of 500 m.

The transmittances of the transmittance measurement samples having the respective thicknesses were measured with a spectrophotometer ("U-4000" (product name) manufactured by Hitachi High-Technologies Corporation), and were each converted into an internal transmittance (1,000 m) at a wavelength of 420 nm and evaluated. When the transmittance for a wavelength of 420 nm was 90% or more, the transmittance was evaluated as being satisfactory. The evaluation result is shown in Table 1.

Examples 2 to 15 and Comparative Examples 1 to 5

Resin compositions were prepared in the same manner as in Example 1 except that the exemplified compounds, the compounds each having at least one thiol group, and the other resin components shown in Tables 1 and 2 were used. The resin compositions were evaluated by the same evaluation methods as those of Example 1. The evaluation results are shown in Tables 1 and 2.

In addition, for each of Examples 3, 4, 5, 7, and 10, and Comparative Example 1, the ratio (carbon atoms/sulfur atoms) of carbon atoms to sulfur atoms was calculated and evaluated by the following method. The evaluation results are shown in Table 3.

(1) XPS Measurement

Samples each having a thickness of 500 m were produced in the same manner as in the measurement of the secondary dispersion characteristic, and then a measurement sample was obtained by peeling the quartz glass from each of the samples. The number of atoms of each of the measurement samples was measured by XPS measurement ("Quantera II" (product name) manufactured by ULVAC-PHI, Inc.), and the ratio of carbon atoms to sulfur atoms was calculated and evaluated.

TABLE 1

| | | Example | | | | | | | | | | Comparative Example | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| (Meth)acrylate compound (A) | M1 | 81 | 72 | 89 | 88 | 85 | 0 | 79 | 78 | 70 | 64 | 90 | 70 | 59 |
| | M2 | 0 | 0 | 0 | 0 | 0 | 83 | 0 | 0 | 0 | 0 | 0 | 0 | 0 |
| Compound having at least one thiol group | S1 | 10 | 10 | 0 | 0 | 0 | 0 | 0 | 0 | 0 | 0 | 0 | 0 | 0 |
| | S2 | 0 | 0 | 2 | 0 | 7 | 0 | 13 | 0 | 22 | 30 | 0 | 0 | 35 |
| | S3 | 0 | 0 | 0 | 0 | 0 | 0 | 0 | 14 | 0 | 0 | 0 | 0 | 0 |
| | S4 | 0 | 0 | 0 | 3 | 0 | 0 | 0 | 0 | 0 | 0 | 0 | 0 | 0 |
| | S5 | 0 | 0 | 0 | 0 | 0 | 9 | 0 | 0 | 0 | 0 | 0 | 0 | 0 |
| Other resin component | R1 | 9 | 18 | 0 | 9 | 0 | 0 | 0 | 0 | 0 | 0 | 10 | 30 | 6 |
| | R2 | 0 | 0 | 9 | 0 | 8 | 8 | 8 | 8 | 0 | 6 | 0 | 0 | 0 |
| | R3 | 0 | 0 | 0 | 0 | 0 | 0 | 0 | 0 | 8 | 0 | 0 | 0 | 0 |
| $\theta_{g,F}$ | | 0.79 | 0.77 | 0.79 | 0.78 | 0.77 | 0.78 | 0.78 | 0.78 | 0.77 | 0.77 | 0.79 | 0.75 | 0.76 |
| Transmittance (420 nm) [%] | | 97.6 | 97.0 | 97.9 | 98.1 | 98.5 | 97.2 | 98.3 | 97.5 | 96.5 | 96.3 | 96.0 | 93.0 | 95.8 |

TABLE 2

| | | Example | | | | | Comparative Example | |
|---|---|---|---|---|---|---|---|---|
| | | Example 11 | Example 12 | Example 13 | Example 14 | Example 15 | Comparative Example 4 | Comparative Example 5 |
| (Meth)acrylate compound (A) | M5 | 81 | 0 | 77 | 0 | 0 | 90 | 0 |
| | M8 | 0 | 88 | 0 | 0 | 0 | 0 | 0 |
| | M10 | 0 | 0 | 0 | 88 | 85 | 0 | 90 |
| Compound having at least one thiol group | S1 | 0 | 0 | 0 | 0 | 3 | 0 | 0 |
| | S2 | 10 | 3 | 0 | 9 | 0 | 0 | 0 |
| | S3 | 0 | 0 | 15 | 0 | 0 | 0 | 0 |
| | S4 | 0 | 0 | 0 | 0 | 0 | 0 | 0 |
| | S5 | 0 | 0 | 0 | 0 | 0 | 0 | 0 |
| Other resin component | R1 | 9 | 0 | 8 | 0 | 12 | 10 | 10 |
| | R2 | 0 | 9 | 0 | 3 | 0 | 0 | 0 |
| | R3 | 0 | 0 | 0 | 0 | 0 | 0 | 0 |
| $\theta_{g,F}$ | | 0.71 | 0.72 | 0.71 | 0.73 | 0.72 | 0.72 | 0.73 |
| Transmittance (420 nm) [%] | | 97.9 | 98.0 | 98.3 | 97.5 | 98.1 | 97.0 | 96.8 |

TABLE 3

| | Example | | | | | Comparative Example |
|---|---|---|---|---|---|---|
| | 3 | 4 | 5 | 7 | 10 | 1 |
| Carbon atoms/sulfur atoms | 129 | 96 | 51 | 34 | 16 | — |
| $\theta_{g,F}$ | 0.79 | 0.78 | 0.77 | 0.78 | 0.77 | 0.79 |
| Transmittance (420 nm) [%] | 97.9 | 98.1 | 98.5 | 98.3 | 96.3 | 96.0 |

As can be seen from the results of Tables 1 and 2, the secondary dispersion characteristic of each of Examples 1 to 15 was 0.65 or more, and the transmittance thereof showed a value as high as 9600 or more at 420 nm.

The transmittances of Examples 1 to 10 showed values higher than that of Comparative Example 1 free of any compound having at least one thiol group. In addition, even when the amount of the compound having at least one thiol group increased, in other words, the amount of the exemplified compound showing a high secondary dispersion characteristic reduced, the secondary dispersion characteristics of Examples 1 to 10 showed high values. In Comparative Example 2 in which the amount of the other resin component was increased and the amount of the exemplified compound was reduced as compared to Comparative Example 1, the secondary dispersion characteristic showed a value lower than those of Examples 1 to 10. This is probably because when the amount of the other resin component is increased, the amount of a cured component formed of the molecules of the resin having a low secondary dispersion characteristic increases to cause a reduction in secondary dispersion characteristic and a reduction in transmittance. Meanwhile, the compound having at least one thiol group may improve the transmittance to provide a secondary dispersion characteristic-maintaining effect.

Comparative Example 4 is an example in which the resin composition using the exemplified compound of Example 11 or 13 is free of any compound having at least one thiol group. Comparative Example 5 is an example in which the resin composition using the exemplified compound of Example 14 or 15 is free of any compound having at least one thiol group. Each of Examples 11 to 15 was improved in transmittance and showed a high secondary dispersion characteristic when the compound having at least one thiol group was incorporated as in Examples 1 to 10.

As can be seen from the results of Table 3, each of Examples was improved in transmittance and showed a high secondary dispersion characteristic as compared to Comparative Example 1.

According to the present invention, there can be provided the optical element including the cured product having a characteristic in that the secondary dispersion characteristic ($\theta_{g,F}$) of refractive indices is high, that is, a chromatic aberration-correcting function is high, and having a high transmittance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-089311, filed May 27, 2021, which is hereby incorporated by reference herein in its entirety.

What is claimed is:

1. A cured product of a resin composition comprising:
a compound represented by general formula (1):

wherein $R_1$ and $R_2$ each independently represent a substituted or unsubstituted alkyl group having 1 to 10 carbon atoms, or a substituted or unsubstituted alkylene group having 1 to 8 carbon atoms, the alkylene group having one selected from the group consisting of an acryloyloxy group and a methacryloyloxy group, and wherein $R_3$ to $R_{12}$ each independently represent a hydrogen atom, a trifluoromethyl group, a substituted or unsubstituted alkyl group, a substituted or unsubstituted alkylene group having one selected from the group consisting of an acryloyloxy group and a methacryloyloxy group, an acryloyloxy group, or a methacryloyloxy group, provided that at least one of $R_3$ to $R_{12}$ represents the trifluoromethyl group, and at least one of $R_1$ to $R_{12}$ has one selected from the group consisting of the acryloyloxy group and the methacryloyloxy group; and a compound having at least one thiol group, wherein a content of the compound having at least one thiol group in the cured product is 30 mass % or less, and wherein the cured product has a secondary dispersion characteristic of 0.65 or more.

2. The cured product according to claim 1, wherein the cured product further comprises another resin component, and
wherein a content of the another resin component in the cured product is 0.01 to 20.0 mass %.

3. The cured product according to claim 2, wherein the another resin component is at least one compound selected from the group consisting of an acrylate compound and a methacrylate compound.

4. The cured product according to claim 1, wherein the content of the compound having at least one thiol group in the cured product is 1 to 15 mass %.

5. The cured product according to claim 4, wherein the content of the compound having at least one thiol group in the cured product is 2 to 10 mass %.

6. The cured product according to claim 1, wherein a ratio of a carbon atom content to a sulfur atom content in the cured product is 15 to 130.

* * * * *